(12) United States Patent  (10) Patent No.: US 7,847,804 B2
Miyazawa  (45) Date of Patent: Dec. 7, 2010

(54) IMAGE DISPLAY SYSTEM (75) Inventor: Yasunaga Miyazawa, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 672 days.

(21) Appl. No.: 11/773,632

(22) Filed: Jul. 5, 2007

(65) Prior Publication Data
US 2008/0007751 A1 Jan. 10, 2008

(30) Foreign Application Priority Data

Jul. 6, 2006 (JP) .............................. 2006-186377
May 28, 2007 (JP) .............................. 2007-140020

(51) Int. Cl.
G06T 1/00 (2006.01)
H04N 1/40 (2006.01)
H04N 1/46 (2006.01)
G06K 9/40 (2006.01)
G03F 3/038 (2006.01)
G09G 5/00 (2006.01)

(52) U.S. Cl. .................... 345/581; 345/619; 345/428; 358/537; 358/448; 358/452; 382/254; 382/276; 715/273

(58) Field of Classification Search ......... 358/537–538, 358/447–448, 452–453; 382/254, 274, 276; 345/581, 619, 428; 715/273, 700; 348/222, 348/552, 571, 584
See application file for complete search history.

(56) References Cited

U.S. PATENT DOCUMENTS 6,480,242 B1 * 11/2002 Okada et al. ................ 348/807
6,661,425 B1 * 12/2003 Hiroaki ....................... 345/629
7,070,286 B2   7/2006 Koyama
7,623,718 B2 * 11/2009 Endo ........................... 382/232
7,742,056 B2 *  6/2010 Miyazawa ................... 345/581
2006/0164497 A1 *  7/2006 Shinohara .................... 347/128
2006/0285025 A1 * 12/2006 Yoshida et al. ................. 349/8
2007/0116380 A1 *  5/2007 Ciuc et al. ................... 382/275
2007/0165048 A1 *  7/2007 Yamashita et al. ........... 345/601
2007/0217774 A1 *  9/2007 Nagaishi et al. ............... 396/55
2007/0248282 A1 * 10/2007 Suzuki ......................... 382/282
2007/0268411 A1 * 11/2007 Rehm et al. .................. 348/650
2009/0304278 A1 * 12/2009 Steinberg et al. ............. 382/167

FOREIGN PATENT DOCUMENTS

JP   A-2002-90880    3/2002
JP   A-2003-153133   5/2003
JP   A-2004-069996   3/2004
JP   A-2004-088194   3/2004
JP   A-2005-156964   6/2005

* cited by examiner

Primary Examiner—Wesner Sajous
(74) Attorney, Agent, or Firm—Oliff & Berridge PLC (57) ABSTRACT An image display system includes: an information processing device that applies a predetermined correction process to image data for display; and an image display device that displays an image based on the image data through with the correction process in the information processing device. In the image display system, the information processing device includes a first image correction computing section that applies, to the image data, any correction process designed based on performance capabilities of the information processing device among a plurality of correction processes that are for application to the image data, and the image display device includes a second image correction computing section that applies, to the image data being a result of the correction process in the information processing device, any correction process being a part of the plurality of correction processes that are for application to the image data but not the correction process to be executed in the information processing device.

14 Claims, 5 Drawing Sheets

IMAGE DISPLAY SYSTEM

BACKGROUND

1. Technical Field

The present invention relates to an image display system, an information processing device for use in the image display system, an image display device for use in the image display system, an image correction program for use in the information processing device, and an image correction program for use in the image display device.

2. Related Art

An image display system of a previously popular type includes a personal computer (PC) serving as an information processing device that supplies image data for display, and a projector that projects, onto a screen, an image through with image processing by the PC.

In such an image display system, image data forwarded from the PC to the projector is subjected to various types of correction processes by an image processing device on the projector side. The correction processes vary in type, including resolution conversion, edge enhancement, black and white extension, shape correction, color conversion, γ correction, VT-γ correction, ghost correction, crosstalk correction, color unevenness correction, and others.

This resultantly increases the size of the image processing device in the projector, thereby causing the higher cost. If any increase of the image quality is expected to a further degree, the processes have to be executed with) higher accuracy, and there thus needs to equip an image processing device with higher performance capabilities. This accelerates the increase of cost.

To deal with such a problem, there is an image display system in which the correction processes varying in type as such are executed on the PC side, and image data through with such correction processes is forwarded to a projector by signal transmission means, e.g., USB cable. As an example, refer to Patent Document 1 (JP-A-2004-69996), and Patent Document 2 (JP-A-2004-88194)

In such an image displays system, the image processing is performed mostly on the PC, and thus the configuration of the projector can be simplified very much. Because the PC is originally capable of graphic processing as a GPU (Graphic Processor Unit), there thus is no need to specially provide the PC with any new function to perform image correction with high accuracy.

In the image display systems of Patent Documents 1 and 2, the PC side takes charge of not only resolution conversion, shape correction, γ correction, VT-γ correction, and others but also ghost correction, crosstalk correction, color unevenness correction, and others, which are better executed, in terms of efficiency, in an image processing section disposed closer to a display device.

This resultantly increases the processing load on the PC side, and thus requires a high-performance CPU (Central Processing Unit), a large-capacity memory, and others. With this being the case, PCs with not enough computing power cannot handle such a case.

SUMMARY

An advantage of some aspects of the invention is to provide an image display system that enables execution of a correction process suited for an Information processing device in view of performance capabilities by dynamically changing the type of correction process for both the information processing device and an image display device based on the performance capabilities of the information processing device, the information processing device for use in the image display system, the image display device for use in the image display system, an image correction program for use in the information processing device, and an image correction program or use in the image display device.

A first aspect of the invention is directed to an image display system, including: an information processing device that applies a predetermined correction process to image data for display; and an image display device that displays an image based on the image data through with the correction process in the information processing device. In the image display system, the information processing device includes a first image correction computing section that applies, to the image data, any correction process designed based on performance capabilities of the information processing device among a plurality of correction processes that are for application to the image data, and the image display device includes a second image correction computing section that applies, to the image data being a result of the correction process in the information processing device, any correction process being a part of a plurality of correction processes that are for application to the image data but not the correction process to be executed in the information processing device.

In the image display system in the first aspect of the invention, in the information processing device, the performance capabilities of its own are used as a basis to select, for setting, which correction processes are to be executed on the side thereof, and the correction processes set as such are accordingly executed. On the other hand, in the image display device, any remaining correction processes not to be executed on the side of the information processing device are executed. As such, the performance capabilities of the information processing device are used as a basis to dynamically change the correction processes for execution on the information processing device side, and the correction processes for execution on the image display device side. This thus enables execution of the correction processes suited for the performance capabilities of the information processing device so that, in the image display system in the aspect of the invention, the allowable range for the performance capabilities can be increased for the information processing device for use wherein.

According to a second aspect of the invention, in the image display system of the first aspect, preferably, the information processing device and the image display device are connected together by signal transmission means.

With a connection established as such by the signal transmission means between the information processing device and the image display device, information exchange is enabled therebetween, thereby implementing the image display system of the first aspect.

According to a third aspect of the inventions, in the image display system of the first or second aspect, preferably, the information processing device includes a performance assessment section that assesses the performance capabilities of the information processing device, and based on the performance capabilities of the information processing device being an assessment result of the performance assessment section, the first image correction computing section selects, for setting, from a plurality of correction processes for application to the image data, any of the correction processes for application in the information processing device.

With such a configuration, the performance assessment section is allowed to assess the performance capabilities of the information processing device. Based on the performance capabilities of the information processing device being the assessment result of the performance assessment section, correction processes for execution in the information processing device can be appropriately selected and set.

According to a fourth aspect of the invention, in the image display system of the third aspect, preferably, the performance assessment section assesses the performance capabilities of the information processing device based on a graphic computing power of the information processing device.

This enables appropriate assessment for the performance capabilities of the information processing device. The assessment result can thus serve as a determination factor to see which correction process is preferable in the information processing device for execution therein with respect to image data.

According to a fifth aspect of the invention, in the image display system of the fourth aspect, preferably, the graphic computing power of the information processing device is preferably assessed at least by either a computing throughput of hardware or that of software related to the graphic computing power.

By assessing the graphic computing power of the information processing device as such by the computing throughput of hardware or that of software related to the graphic computing power, the graphic computing power of the information processing device can be assessed appropriately, and eventually, the performance capabilities of the information processing device can be assessed appropriately.

The computing throughput of a hardware related to the graphic computing power is affected by, for example, the type and version of a CPU, the operation clock and the amount of memory in a main board and the type and version of a GPU, the operation clock, and the amount of memory in a graphic board.

The computing throughput of any software related to the graphic computing power is affected by, for example, the type and version of an OS (Operating System), and the type and version of an OS driver in a main board or by a driver and the version thereof in a graphic board. The computing throughput of any software related to the graphic computing power is also affected by, for example, the type and version of software additionally provided for the purpose of increasing the graphic computing power to a further extent. The software additionally provided for increasing the graphic computing power is exemplified by an accelerator through with tuning to a GPU.

According to a sixth aspect of the invention, in the image display system of the fifth aspect, preferably, the computing throughput of hardware and the computing throughput of software related to the graphic computing power are assessed by running, in the information processing device, a program for assessing the graphic computing power.

Through assessment of the computing throughput of hardware or that of software related to the graphic computing power by actually running a performance assessment program in the information processing device as such, the computing throughput of hardware or that of software related to the graphic computing power can be appropriately assessed. Note here that assessing the computing power is exemplified by assessing a time taken for a computing process when a program for performance assessment is actually run in the information processing device, i.e., computing processing time. This enables to make an assessment that, when the computing processing time is smaller than a predetermined threshold value set for the processing time, the information processing device has the performance capabilities equal to or higher than a reference value.

According to a seventh aspect of the invention, in the image display system of any one of the first to sixth aspects, preferably, when a plurality of correction processes for application to the image data are classified into a first correction process group for any of the correction processes to be executed in a first half of a correction process sequence, and a second correction process group for any of the correction processes to be executed in a latter half of the correction process sequence, and the first image correction computing section executes, when the performance capabilities of the information processing device are of a reference value or more, the correction processes both in the first and second correction process groups.

Assuming here is that the correction processes for the image data include resolution conversion, edge enhancement, black and white extension, shape correction, color conversion, $\gamma$ correction, VT-$\gamma$ correction, ghost correction, crosstalk correction, and color unevenness correction, and are executed in this order in a correction process sequence. In this case, the first correction process group for any of the correction processes to be executed in a first half of the correction process sequence includes resolution conversion, edge enhancement, black and white extension, shape correction, color conversion, $\gamma$ correction, and VT-$\gamma$ correction. The second correction process group for any of the correction processes to be executed in a latter half of the correction process sequence includes ghost correction, cross talk correction, and color unevenness correction.

When the performance capabilities of the information processing device are equal to or larger than the reference value, the first image correction computing section in the information processing section executes all of the correction processes in the first and second correction process groups. By dynamically selecting and setting which correction processes are to be executed in the information processing device as such based on the performance capabilities of the information processing device, the execution of correction processes can be suited for the performance capabilities of the information processing device.

When the performance capabilities of the information processing device are smaller than the reference value, alternatively, the correction processes in the first correction process group may be executed on the information processing device side, and the correction processes in the second correction process group may be executed on the image display device side. If this is the case, the correction processes found in the first correction process group for execution on the information processing device side are executed, mainly, for every pixel in an image.

As such, in the correction processes on the information processing device side, every pixel data is subjected only to any predetermined conversion, and the compression rate does not show much of a change in various cases, e.g., compress image data through with any correction process for transmission, compress image data of an image not yet through with any correction process, and compress image data of an image through with any correction process. Accordingly, even if image data through with any correction process on the information processing device side is forwarded to the image display device by signal transmission means with severe restrictions on a transmission rate, e.g., USB (Universal Serial Bus) cable, there are effects of being able to display an image with an appropriate frame rate in the image display device.

According to an eighth aspect of the invention, in the image display system of any one of the first to seventh aspects, preferably, the information processing device has a function of notifying, to the image display device, information about the correction process to be executed in the information processing device among a plurality of correction processes for application to the image data.

With such information notified to the image display device, the image display device can acknowledge what correction processes are executed in the information processing device, and based thereon, the image display device can appropriately select and set what correction processes to execute.

According to a ninth aspect of the invention, in the image display system of any one of the first to eighth aspects, preferably, the information processing device includes a transmission data generation section that generates transmission data, for transmission to the image display device, by compressing the image data through with the correction process in the first image correction computing section.

With such a configuration, image data through with any correction process can be compressed by any predetermined compression mode. This enables appropriate transmission of moving images or others to the image display device with no loss of image data even if the image data through with any correction process on the information processing device side is forwarded to the image display device by signal transmission means with severe restrictions on a transmission rate, e.g., USB cable.

According to a tenth aspect of the invention, in the image display system of any one of the first to ninth aspects, preferably, the information processing device includes a correction parameter storage section that stores therein a correction parameter needed for the correction process to be executed in the first image correction computing section.

The correction parameter storage section is for making it store therein any acquired correction parameter that is in need for correction processes allowed to be executed in the information processing device as a result of performance assessment therefor. With the correction parameter storage section equipped as such, the information processing device becomes able to acquire, with ease and appropriateness, any correction parameter needed for execution of correction processes suited for its own performance capabilities from the image correction parameter storage section. Alternatively from a memory card, a CD-ROM, and others recorded with such correction parameters varying in type, the information processing device may acquire any needed correction parameters for storage in the image correction parameter storage section. Note here that these correction parameters can be newly added or changed by a user using a keyboard or others of his or her PC.

An eleventh aspect of the invention is directed to an information processing device that applies a predetermined correction process to image data for display by an image display device, including an image correction computing section that applies, to the image data, any correction process designed based on performance capabilities of the information processing device among a plurality of correction processes that are for application to the image data.

By the information processing device being configured as such, the resulting information processing device can be suitable for the image display system of the first aspect. Note that, it is preferable that the information processing device of the eleventh aspect is also provided with the characteristics of the Image display systems of the second to tenth aspects.

A twelfth aspect of the invention is directed to an image display device that displays an image based on image data being a result of a correction process executed in an information processing device in accordance with performance capabilities of the information processing device, including an image correction computing section that applies, to the image data being the result of the correction process in the information processing device, any correction process being a part of a plurality of correction processes that are for application to the image data but not the correction process to be executed in the information processing device.

By the image display device being configured as such, the resulting image display device can be suitable for the image display system of the first aspect.

According to a thirteenth aspect of the invention, in the image display device of the twelfth aspect, preferably, the image correction computing section has a function of selecting, for setting, any correction process being a part of a plurality of correction processes that are for application to the image data notified by the information processing device but not the correction process to be executed in the information processing device cased on information about the correction process to be executed in the information processing device.

With the image correction computing section of the image display device provided with such a function, the image correction computing section of the image display device becomes able to appropriately select and set correction processes for execution on the image display device side.

A fourteenth aspect of the invention is directed to an image correction program in an information processing device including an image correction computing section that applies a predetermined correction process to image data for display by an image display device, including making the image correction computing section to apply, to the image data, any correction process designed based on performance capabilities of the information processing device among a plurality of correction processes that are for application to the image data.

By installing such an image correction program into the information processing device, the image correction computing section of the information processing device uses the performance capabilities of the information processing device as a basis to select and set a correction process for execution in the information processing device so that the correction processes selected and set as such can be accordingly executed. Note here that it is preferable that the image correction program in the information processing device of the fourteenth aspect is also provided with the characteristics of the image display systems of the second to eighth aspects above.

A fifteenth aspect of the invention is directed to an image correction program in an information display device including an image correction computing section that can execute a predetermined correction process to image data being a correction process result of an information processing device executed in accordance with performance capabilities of the Information processing device, including making the image correction computing section to apply, to the image data being the correction process result of the information processing device, any correction process being a part of a plurality of correction processes that are for application to the image data but not the correction process to be executed in the information processing device.

By installing such an image correction program into the image display device, the image correction computing section of the information processing device becomes able to execute any correction processes other than the correction process to be executed in the information processing device Note here that it is preferable that the image correction program in the image display device of the fourteenth aspect is also provided with the characteristics of the image display device of the thirteenth aspect above.

BRIEF DESCRIPTION OF THE DRAWINGS

The invention will be described with reference to the accompanying drawings, wherein like numbers reference like elements.

DESCRIPTION OF EXEMPLARY EMBODIMENTS

In the below, an embodiment of the invention is described.

Figure 1:
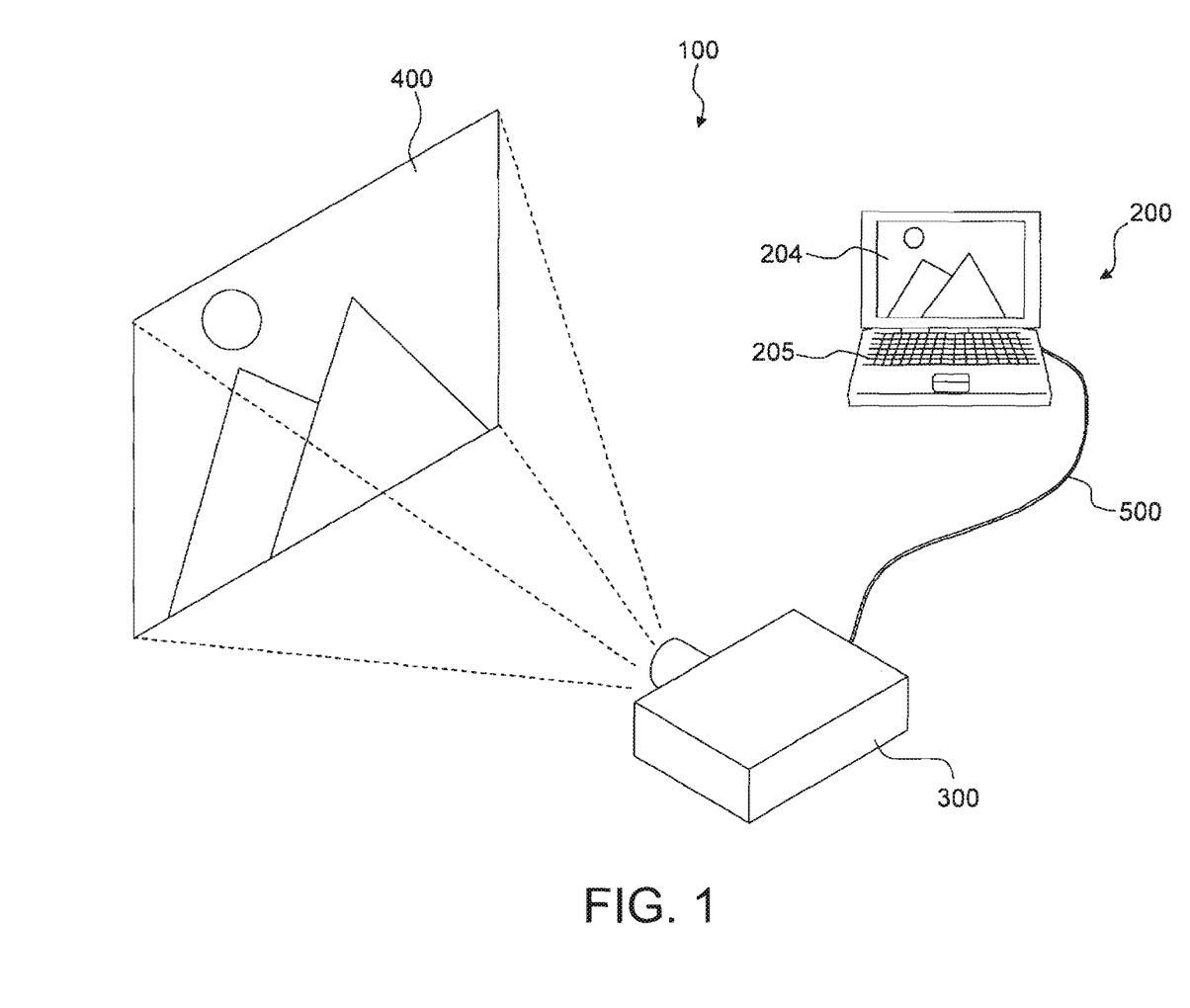
FIG. 1 is a diagram showing the external configuration of an image display system in an embodiment of the invention.

FIG. 1 is a diagram snowing the external configuration of an image display system in the embodiment of the invention. As shown in FIG. 1, an image display system 100 in the embodiment of the invention is configured to include a personal computer (PC) 200, a projector 300, and a USB cable 500, for example. The PC 200 serves as an information processing device that applies image processing to image data for display, and outputs the resulting image data. The Image processing here includes various types of correction processes The projector 300 serves as an image display device that generates display image data based on the image data from the PC 200, and projects an image corresponding to thus generated display image data onto a screen 400. The USB cable 500 serves as signal transmission means for establishing a connection between the projector 300 and the PC 200.

Figure 2:
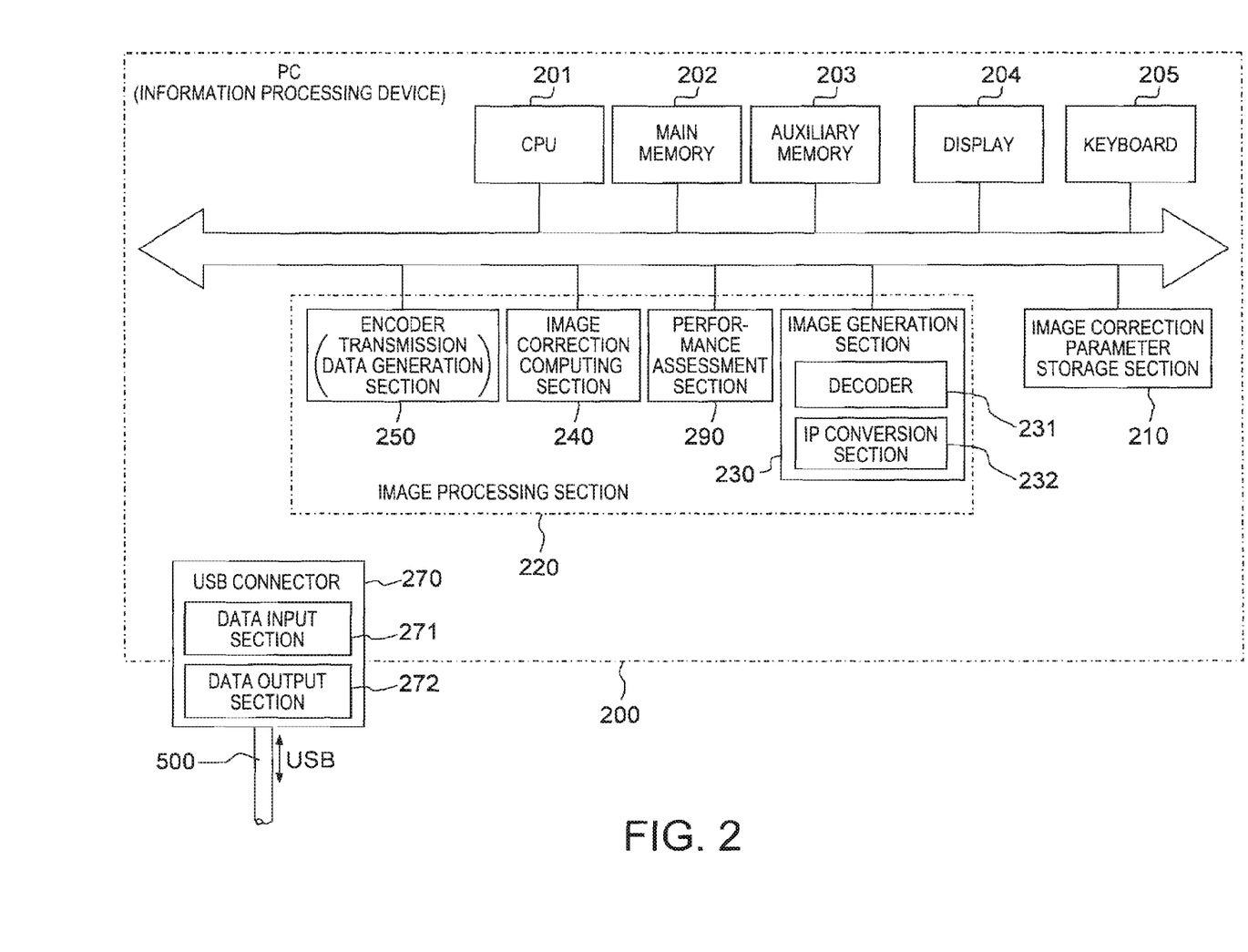
FIG. 2 is a function block diagram of a PC 200.

FIG. 2 is a function block diagram of the PC 200.

Figure 3:
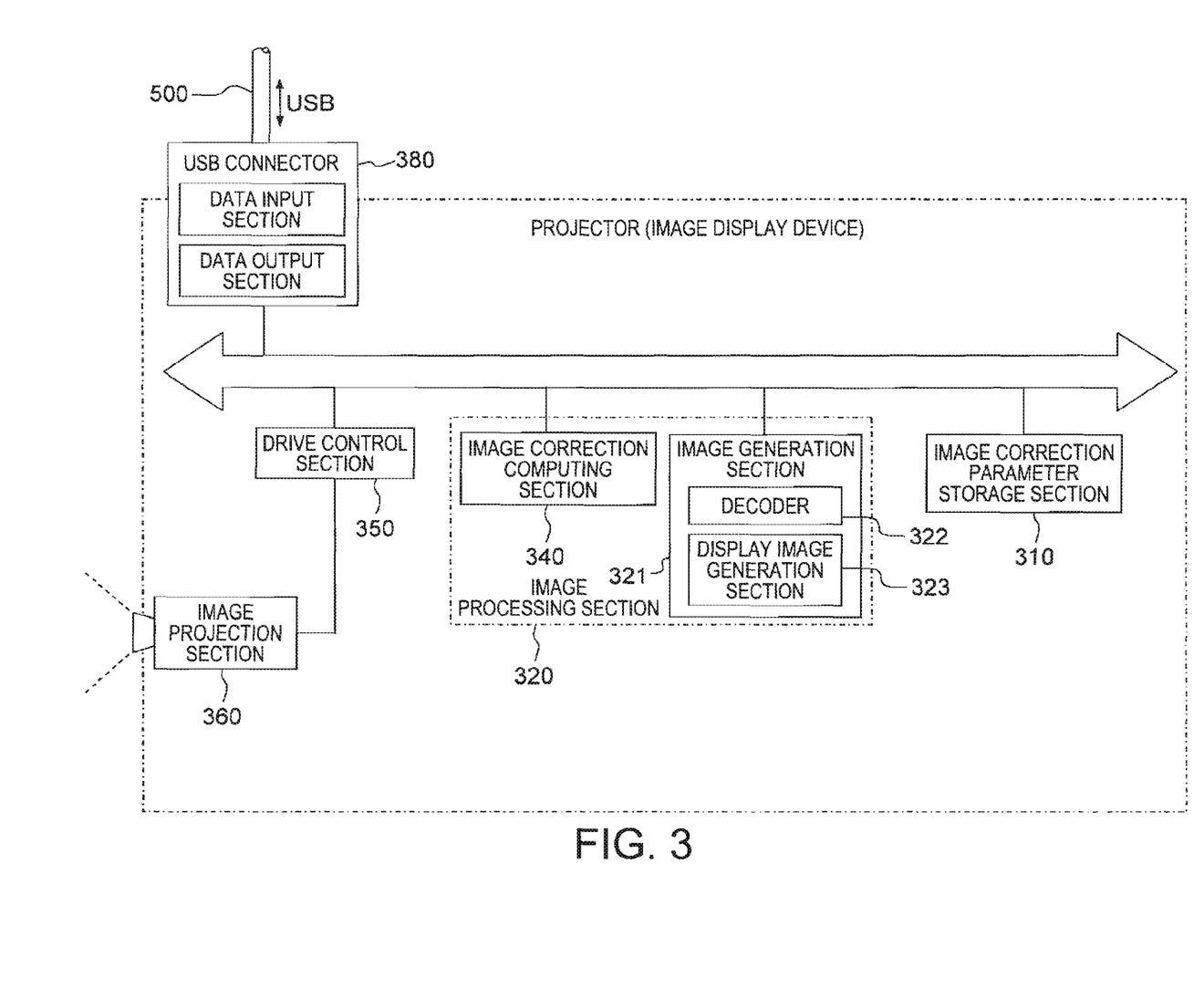
FIG. 3 is a function block diagram of a projector 300.

FIG. 3 is a function block diagram of the projector 300.

Figure 4:
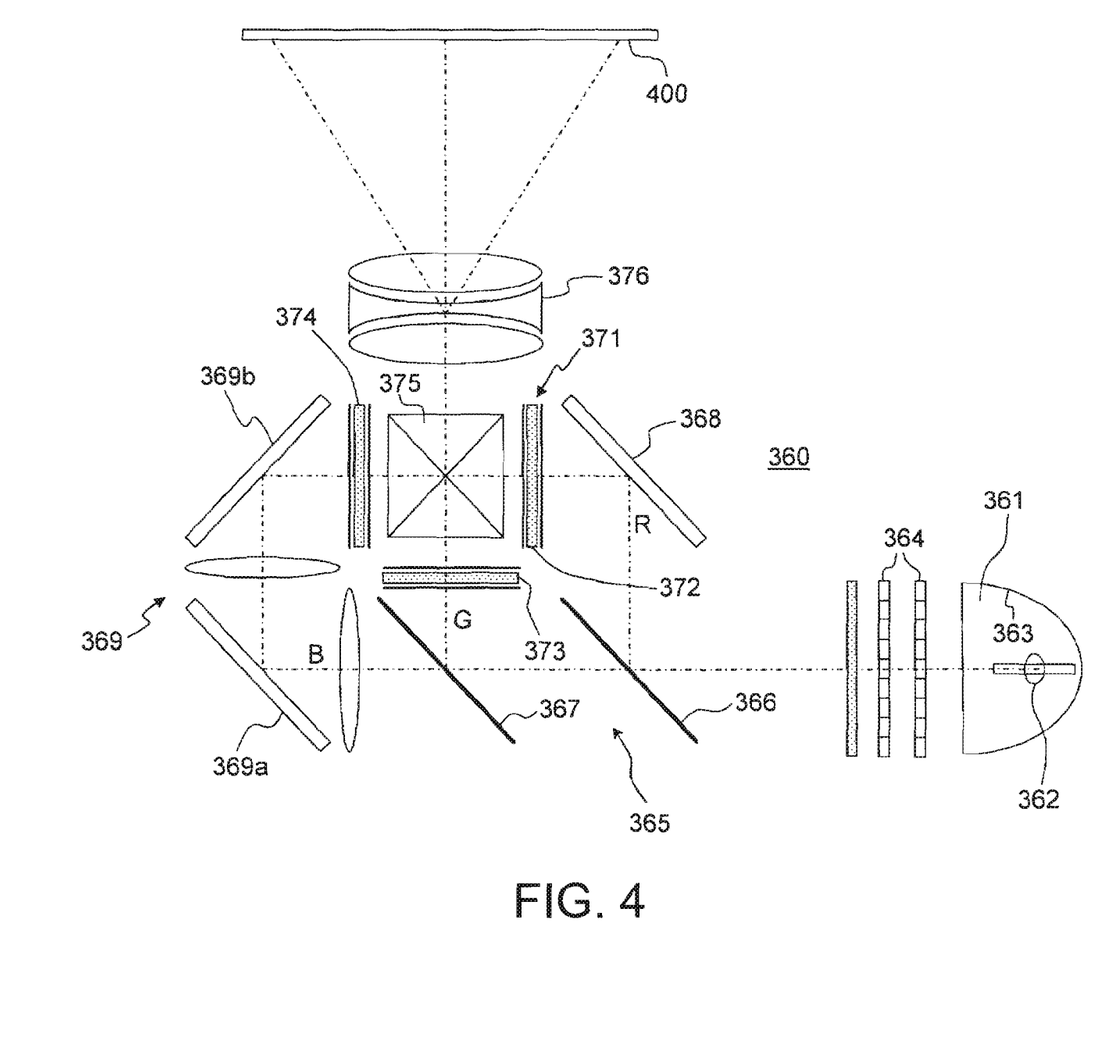
FIG. 4 is a diagram showing the configuration of an image projection section 360 in the projector 300.

FIG. 4 is a diagram showing the configuration of an image projection section 360 in the projector 300.

Figure 5:
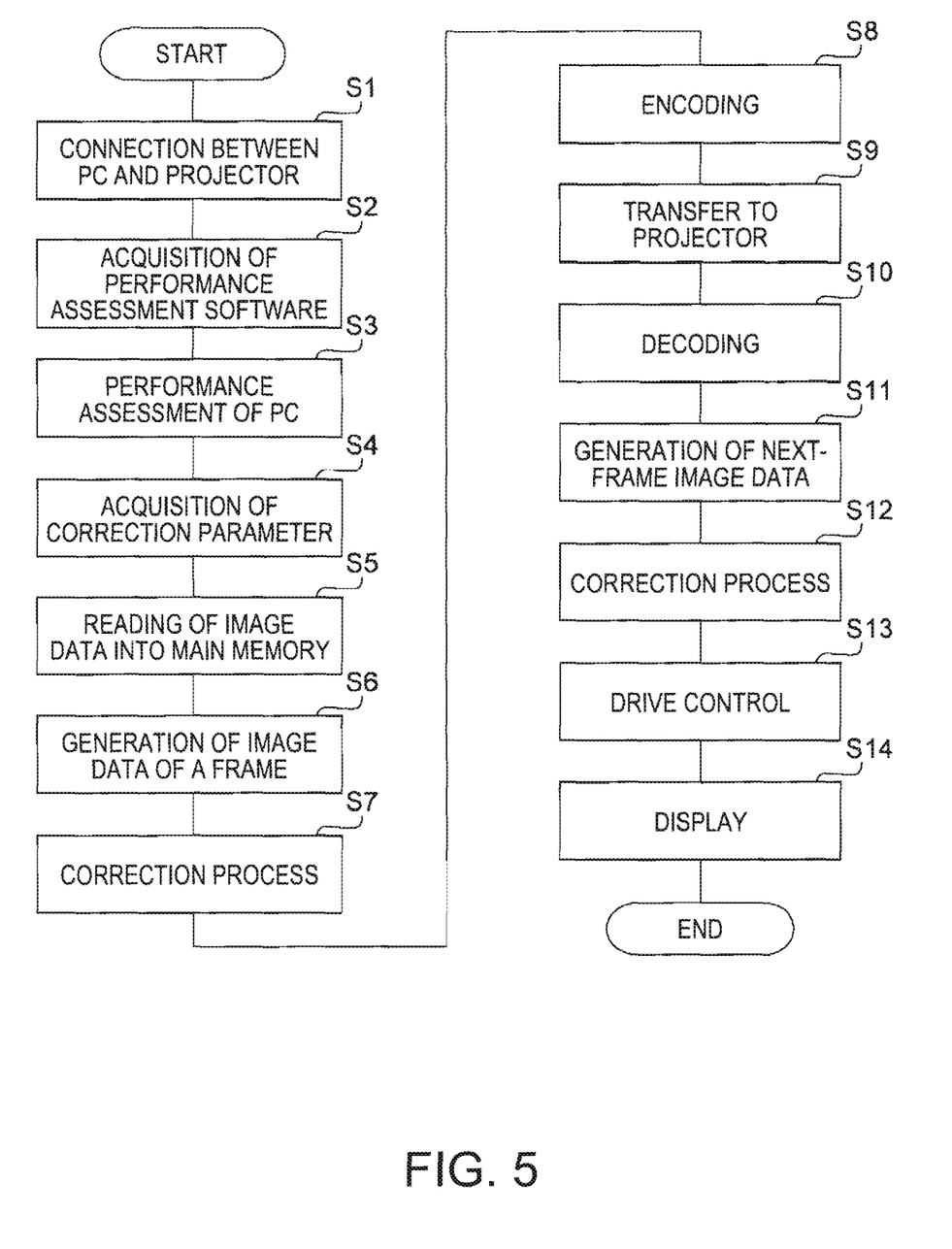
FIG. 5 is a flowchart for illustrating the operation of the image display system of the embodiment of the invention.

FIG. 5 is a flowchart for illustrating the operation of the image display system of the embodiment of the Invention.

As shown in FIG. 2, the PC 200 is configured to Include a CPU 201, a main memory 202, an auxiliary memory 203, a display 204, a keyboard 205, an image correction parameter storage section 210, an image processing section 220, and a USB connector 270.

The auxiliary memory 203 stores therein image data for display (hereinafter, simply referred to as image data), and the like. Alternatively, the image data may be stored in a DVD (Digital Versatile Disc), for example.

The image correction parameter storage section 213 snores therein any correction parameter needed for a correction process for execution by an image correction computing section 240. The correction parameter will be described in detail later.

The image processing section 220 is configured to include an image generation section 233, the image correction computing section (first image correction computing section) 240, an encoder 250 serving as a transmission data generation section, and a performance assessment section 290.

The image generation section 230 is configured to include a decoder 231 and an IP (Interlace/progressive) conversion section 232, and generates image data for every frame through decompression in accordance with the data format of the image data.

The performance assessment section 290 makes an assessment whether the performance capabilities of the PC 200 take a reference value or higher. The assessment whether the performance capabilities of the PC 200 take a reference value or higher can be made based on the graphic computing power of the PC 200. In the embodiment of the invention, the graphic computing power of the PC 200 is to be assessed at least by either the computing throughput of hardware or that of software related to the graphic computing power.

The computing throughput of hardware or that of software related to the graphic computing power is exemplarily assessed by a time taken for a computing process (computing time) at the time of running a program in the PC 200. The program here is also referred to as performance assessment software, and is for assessing the graphic computing power acquired from the projector 300. In the embodiment of the invention, the computing time is set with a predetermined threshold value, and when the computing time is shorter than the threshold value, the performance capabilities of the PC 200 are assessed as being equal to or higher than the reference value.

Note here that the performance assessment software may be acquired only for once from the projector 300 when the PC 200 and the projector 30Q are connected together.

The computing throughput of a hardware related to the graphic computing power is affected by, for example, the type and version of a CPU, the operation clock and the amount of memory in a main board and the type and version of a GPU, the operation clock, and the amount of memory in a graphic board.

The computing throughput of any software related to the graphic computing power is affected by, for example, the type and version of an OS, and the type and version of an OS driver in a main board or a driver and the version thereof in a graphic board. The computing throughput of any software related to the graphic computing power is also affected by, for example, the type and version of software additionally provided for the purpose of increasing the graphic computing power to a further extent. The software additionally provided for increasing the graphic computing power is exemplified by an accelerator through with tuning to a GPU.

Using the correction parameters stored in the image correction parameter storage section 210, the image correction computing section 240 selects and sets any correction processes suited for the performance capabilities of the PC 200, and executes the correction processes selected and set as such.

The image correction computing section 240 has a function of generating information indicating which of a plurality of correction processes are to be executed on the side of the PC 200. Such information is referred to as correction command information, and the correction processes are those supposed to be applied to image data. This correction command information is notified to the projector 300 at a predetermined timing, which will be described later.

The encoder 250 serves to compress the image data being the correction result of the image correction computing section 240 for transmission to the projector 300. Specifically, the encoder 250 has a function of comparing, in the image data being the correction result of the image correction computing section 240, an image data portion of the latest frame and another image portion of the frame preceding thereto, and extracting any found difference as differential data. The difference data includes a spatial change and a color tone change.

The USB connector 270 is configured to include a data input section 271 and a data output section 272, and performs data input/output to/from the projector 300 over the USB cable 500.

Described next is the configuration of the projector 300.

As shown in FIG. 3, the projector 300 is configured to include an image correction parameter storage section 310, an image processing section 320, a drive control section 350, an image projection section 360, and a USB connector 380.

The correction parameters for storage in the image correction parameter storage section 310 include parameters for resolution conversion, edge enhancement, black and white extension, shape correction, color conversion, γ correction, VT-γ correction, ghost correction, crosstalk correction, color unevenness correction, and the like. The ghost denotes the phenomenon in which a video looks overlapped due to displacement, and the crosstalk denotes unevenness of an image caused by pixels being driven by the leakage current of a signal for the adjacent pixels.

The image processing section 320 is configured to include an image generation section 321 and an image correction computing section (second image correction computing section) 340. The image generation section 321 is configured to include a decoder 322 and a display image generation section 323.

The decoder 322 decodes image data being the encoding result provided by the PC 200, i.e., image data through with image processing including correction processes.

The display image generation section 323 combines the differential data being the decoding result of the decoder 322 to the image data of a frame corresponding to the image that is currently projected. The resulting image data is to be projected next.

Based on the correction command information notified by the PC 200, the image correction computing section 340 has a function of selecting and setting which correction processes are to be executed on the side of the projector 300. The image correction computing section 340 then applies a correction process to the image data generated by the display image generation section 323. Note here that the correction processes to be executed by the image correction computing section 340 are not including the correction process to be executed by the PC 200.

The drive control section 350 outputs a control signal for driving the image projection section 360.

As shown in FIG. 4, the image projection section 360 is configured to include, schematically, a light source section 361, two lens arrays 364, a color separation system 365, an electro-optical modulation device 371, a cross dichroic prism 375, and a projection system 376.

In such a configuration, a light coming from the light source 362 is collimated by a reflector 363, and the resulting collimated luminous flux is directed to the color separation system 365 after going through the two lens arrays 364. The color separation system 365 is configured to include dichroic mirrors 366 and 367, and separates the light-into three colors of red, green, and blue. The dichroic mirror 366 reflects the light of red (R), and passes through the lights of green (G) and blue (B). The dichroic mirror 367 reflects the light of green, and passes through the light of blue.

The light of red is reflected by a reflective mirror 368, the color of green is reflected by the dichroic mirror 367, and the light of blue is guided to a relay system 369 provided with two reflective mirrors 369a and 369b. These lights of red, green, and blue then enter the electro-optical modulation device 371, i.e., a liquid crystal panel (light modulator) 372 for red color, a liquid crystal panel (light modulator) 373 for green color, and a liquid crystal panel (light modulator) 374 for blue color, respectively. The lights of three colors are respectively subjected to predetermined modulation in the liquid crystal panels 372 to 374 in accordance with image data, and then are combined in the cross dichroic prism 375. The resulting combined image is emitted from the projection system 376, and then is extended and projected on the screen 400.

Note here that the image projection section 360 of FIG. 4 is no more than an example, and the configuration of FIG. 4 is not the only option.

The correction processes using the correction parameters stored in the image correction parameter storage section 310, i.e., parameters for resolution conversion, edge enhancement, black and white extension, shape correction, color conversion, γ correction, VT-γ correction, ghost correction, crosstalk correction, color unevenness correction, and others, are executed in time series with a predetermined order.

In the embodiment of the Invention, based on the order of the correction process sequence, the correction processes varying in type as above are classified into those for a first half of the sequence, and those for a latter half of the sequence. The correction processes for the first half of the sequence are those in a first correction process group, and the correction processes for the latter half of the sequence are those in a second correction process group.

That is, assuming here is that the correction processes varying as such include resolution conversion, edge enhancement, black and white extension, shape correction, color conversion, γ correction, VT-γ correction, ghost correction, crosstalk correction, and color unevenness correction, and are executed in this order in a correction process sequence. In this case, the first correction process group for any of the correction processes to be executed in a first half of the correction process sequence includes resolution conversion, edge enhancement, black and white extension, shape correction, color conversion, γ correction, and VT-γ correction. The second correction process group for any of the correction processes to be executed in a latter half of the correction process sequence includes ghost correction, crosstalk correction, and color unevenness correction.

By referring to the flowchart of FIG. 5, described now is the operation of the image display system in the embodiment of the invention configured as such.

First of all, a connection is established between the PC 200 and the projector 300 over the USB cable 500 (step S1). The PC 200 acquires performance assessment software from the projector 300 for assessment of the performance capabilities of the PC 200 (step S2). Using the performance assessment software acquired from the projector 300, the performance assessment section 290 assesses the performance capabilities of the PC 200 (step S3). As described above, in the process in step S3, an assessment is made whether the performance capabilities of the PC 200 are equal to or higher than a reference value based on the processing time taken when the performance assessment software acquired from the projector 300 is executed in the PC 200

Thereafter, based on the resulting performance capabilities assessed by the performance assessment section 290, the image correction computing section 240 of the PC 200 selects and sets any correction processes executable on the side of the PC 200, and acquires any correction parameters needed for thus selected and set correction processes from the projector 300 (step S4). Thus acquired correction parameters are stored in the image correction parameter storage section 210.

Note that, when the result derived by the performance assessment section 290 tells that the performance capabilities of the PC 200 are lower than the reference value, the image correction computing section 240 selects and sets the correction processes in the first correction process group, i.e., resolution conversion, edge enhancement, black and white extension, shape correction, color conversion, γ correction, and VT-γ correction, and executes these correction processes.

On the other hand, when the result derived by the performance assessment section 290 tells that the performance capabilities of the PC 200 are equal to or higher than the reference value, the image correction computing section 240 selects and sets the correction processes in the first correction process group, i.e., resolution conversion, edge enhancement, black and white extension, shape correction, color conversion, γ correction, and VT-γ correction, and the correction processes in the second correction process group, i.e., ghost correction, crosstalk correction, and color unevenness correction, and executes these correction processes selected and set as such.

Assumed in this example is that the result derived by the performance assessment section 290 tells that the performance capabilities of the PC 200 are lower than the reference value. In this case, the image correction computing section 240 of the PC 200 selects and sets the correction processes in the first correction process group, i.e., resolution conversion, edge enhancement, black and white extension, shape correction, color conversion, γ correction, and VT-γ correction. Therefore, the remaining correction processes in the second correction process group, i.e., ghost correction, crosstalk correction, and color unevenness correction, are to be executed on the side of the projector 300.

After selecting and setting the correction processes executable on the side of the PC 200 as such, the image correction computing section 240 generates correction command information, which indicates which correction processes are to be executed on the side of the PC 200. This correction command information is notified to the projector 300 at a predetermined timing. The timing of notifying the correction command information to the side of the projector 300 is not specifically restricted, but may be when the image correction computing section 240 forwards the image data through with the correction processes to the projector 300.

As an example, when the encoder 250 generates transmission data, the correction command information is written to the header of the image data that is to be firstly transmitted so that the projector 300 can be notified thereof. Note here that once is enough for such notification of the correction command information to the projector 300 unless the PC for use in the image display system is replaced with another with different performance capabilities.

In the PC 200, the CPU 201 exercises control over a DVD or others, and reads the image data into the main memory 202 (step S5). The image generation section 230 of the PC 200 applies image processing to the image data read into the main memory 202 as such, and the image generation section 230 generates image data of a frame (step S6) for storage in the main memory 202. The image processing is applied in accordance with the data format of the image data, and is exemplified by decoding or IP (Interlace/Progressive) conversion. The image data of a frame generated by the image generation section 230 is subjected to a correction process by the image correction computing section 240 (step S7).

Described next is the correction process for the image data of a frame stored in the main memory 202. At the time of this correction process, the image correction computing section 240 selects and sets which correction process to execute based on the performance capabilities of the PC 300 assessed by the performance assessment section 290.

In this example, because the correction processes in the first correction process group are assumed as being executed on the side of the PC 200, in the image correction computing section 240, the correction processes executed on the side of the PC 200 are those in the first correction process group, and the image data of a frame being the result of the correction processes is encoded (step S8). After encoding as such, the resulting image data of a frame is forwarded to the projector 300 over the USB cable 500 (step S9).

Alternatively, at the time of encoding a difference from the image data of a frame preceding thereto may be found, and the resulting differential data may be forwarded to the projector. In the embodiment of the Invention, the PC 200 is assumed as forwarding such differential data to the projector 300.

On the other hand, on the side of the projector 300, the image data of a frame coming from the PC 200, i.e., the differential data, is decoded by the decoder 322 (step S10), and the decoded differential data is combined by the display image generation section 323 to the currently-displayed image data so that the image data of a frame is generated for display (step S11) The resulting image data is referred to as next-frame image data.

The next-frame image data generated in step S11 is then subjected to correction processes in the image correction computing section 340 (step S12). Note here that the Image correction computing section 340 determines which correction processes are being executed on the side of the PC 200 based on the correction command information provided by the PC 200, and based on the determination result, selects and sets the correction processes for execution on the side of the projector 300. In this case, because the correction processes to be executed on the side of the PC 200 are those in the first correction process group, the correction processes to be executed in the image correction computing section 340 are those in the second correction process group, i.e., crosstalk correction, ghost correction, the color unevenness correction, and the like. If required, intensity nonuniformity correction is also executed, for example.

After the next-frame image data is generated as such, a control signal is forwarded from the drive control section 350 to the image projection section 360 for displaying the next-frame image data. In response to the control signal, the drive control is exercised for display of the next-frame image data (step S13), and an image is projected from the image projection section 360 to the screen 400 so that the image is accordingly displayed on the screen 400 (step S14).

Described above is the case where, based on the performance capabilities assessed by the performance assessment section 290, the correction processes to be executed on the side of the PC 200 are those in the first correction process group. Alternatively, when the performance assessment section 290 assesses that the performance capabilities of the PC 200 are equal to or higher than a reference value, the image correction computing section 240 of the PC 200 determines that the PC 200 can handle the correction processes both in the first and second correction process groups. In this case, the PC 200 executes the correction processes in the first correction process group, i.e., resolution conversion, edge enhancement, black and white extension, shape correction, color conversion, γ correction, and VT-γ correction, and the correction processes in the second correction process group, i.e., ghost correction, crosstalk correction, and color unevenness correction.

With the correction processes both in the first and second correction groups executed on the side of the PC 200 as such, the resulting correction can be of higher accuracy.

According to the embodiment of the invention as described above, based on the performance capabilities of the PC 200, the correction processes for execution in the PC 200 and the projector 300 are to be dynamically changed.

When the performance capabilities of the PC 200 are lower than a reference value, the correction processes in the first correction process group are so set as to be executed on the side of the PC 200, and the correction processes in the second correction process group are so set as to be executed on the side of the projector 3100. On the other hand, when the performance capabilities of the PC 200 are equal to or higher than the reference value, the correction processes both in the first and second correction process groups are so set as to be executed on the side of the PC 200. The execution of correction processes suited for the performance capabilities of the PC 200 is enabled as such, and thus the allowable range can be increased for the Performance capabilities of a PC for use in the image display system.

When the image data is moving images, in the correction processes on the side of the PC 200, every pixel data is subjected only to any predetermined conversion because the correction processes in the first correction process group for execution on the side of the PC 200 are mainly executed for every pixel in an image. Therefore, the compression rate does not show much of a change between the cases of compressing image data not yet through with any correction process, and compressing image data through with any correction process. Accordingly, even if image data through with any correction process on the side of the PC 200 is forwarded to the projector 303 by signal transmission means with severe restrictions on a transmission rate, e.g., USB cable, there are effects of being able to display images with an appropriate frame rate in the image display device.

The setting as such, i.e., setting the correction processes in the first correction process group to those for execution on the side of the PC 200, is preferable when the transfer speed and the processing speed are important in image data for display such as moving images.

Moreover, by executing the correction processes in the first correction process group on the side of the EC 200, the computing power of the PC 200 is provided with the graphic processing capability such as GPU so that the correction processes can be executed in real time with high accuracy even for moving images. If correction such as color conversion is applied by the image processing means in the projector, for example, due to the restrictions of the circuit configuration, the color conversion has been difficult with high accuracy because the RGB three-dimension color space is mostly subjected to color conversion by linear approximation. However, the invention can solve such a problem. This is applicable not only to color conversion but to any other type of corrections.

On the other hand, when the correction, processes both in the first and second correction process groups are executed on the side of the PC 200, the PC 200 can handle the correction processes with higher accuracy so that the display image displayed by the projector 300 can be increased in quality to a greater extent.

The setting as such, i.e., setting the correction processes in both the first and second correction process groups to those for execution on the side of the PC 200, is preferable when the display quality is important in image data for display such as still images.

Herein, at the time of selecting and setting which correction Processes are to be executed on the side of the PC 200, a determination factor for the level that can be achieved for the correction processes on the side of the Pr 200 is the performance capabilities of the PC 200 as described above, e.g. when the performance capabilities of the PC 200 are lower than a reference value, only the correction processes in the first correction process group are executed on the side of the PC 200, and when the performance capabilities thereof are equal to or higher than the reference value, the correction processes in both the first and second correction process groups are executed on the side of the PC 200. Alternatively, the performance capabilities of the PC 200 may be assessed in more detail, and based on the detailed results of the assessment, the level of the correction processes may be set for execution on the side of the PC 200. Note here that in view of the effects of reducing the processing load of the projector 300, the processes of resolution conversion, edge enhancement, black and white extension, shape correction, and others are preferably executed on the side of the Pot 200.

As described in the foregoing, according to the image display system of the embodiment of the invention, the correction processes for execution on the side of the PC 200 and the correction processes for execution on the side of the projector 300 can be dynamically changed based on the performance capabilities of the PC 200. Accordingly, even if the projector 300 is of hardware configuration in which every correction process, i.e., correction processes in both the first and second correction process groups, is executed on the side of the projector 300, the performance capabilities of the protector can be suppressed to a level of being able to execute the correction processes with any limited accuracy. The projector 300 for use in the image display system in the embodiment of the invention can be thus low in cost compared with any ordinary projector.

Even with such a projector, if the image display system in the embodiment wants to display images requiring any high-accuracy correction processes, using a PC with higher performance capabilities enables thus required high-accuracy correction processes. For any images not specifically requiring high-accuracy image display, any inexpensive PC with lower performance capabilities or portable information processing terminal, can be used therefor. As an extreme example, every correction process can be executed on the projector side.

According to the image display system of the embodiment as such, with a dynamic change allowed for the correction processes for execution on the side of the PC 200 and the correction processes for execution on the side of the projector 300 based on the performance capabilities of the PC 200, the resulting correction processes can be executed in accordance with the performance capabilities of an information processing device such as PC for use in the image display system.

While the invention has been described in detail, the foregoing description is in all aspects illustrative and not restrictive. It is understood that numerous other modifications and variations can be devised without departing from the scope of the invention.

For example, described in the above embodiment is the case in which various types of correction parameters needed for correction processes to be executed on the side of the PC 200, i.e., correction parameters needed for correction processes in the first correction process group and correction parameters needed for correction processes in the second correction process group, are acquired by the PC 200 from the projector 300 for storage in the image correction parameter storage section 210. This is surely not restrictive, and alternatively, the PC 200 may acquire correction parameters in need from a memory card, CD-ROM, and others recorded with such various types of correction parameters for storage in the image correction parameter storage section 210.

Still alternatively, such various types of correction parameters may be newly added or changed by a user operation through a keyboard or others of the PC.

In the above embodiment, the correction processes are classified into two groups, i.e., the first correction process group includes resolution conversion, edge enhancement, black and white extension, shape correction, color conversion, $\gamma$ correction, and VT-$\gamma$ correction for execution in a first half of the correction process sequence, and the second correction process group includes ghost correction, crosstalk correction, and color unevenness correction for execution in a latter half of the correction process sequence. This is surely not restrictive, and either ghost correction or crosstalk correction may be included in the first correction process group.

Moreover, in the above embodiment, the correction process modes for the correction processes in accordance with the performance capabilities of the PC 200 are exemplified by the correction process mode (referred to as correction process mode A) for the correction processes in the first correction process group, and the correction process mode (referred to as correction process mode B) for the correction processes in the both first and second correction process groups. To indicate which of the correction process modes, i.e., the correction process mode A or B, is currently activated in the PC 200, the PC 200 may be provided with a function of displaying such an indication for a user.

With this being the case, an indicator for display of correction process mode or others is displayed on the screen of the PC 200, and the indicator displays which of the correction process modes, i.e., the correction process mode A or B, is currently activated. Such display of correction process mode can be made also on the side of the projector 300.

In the embodiment described above, exemplified as an image display device is a projector. The projector is surely not the only possible option, and a direct-view-type image display device is also a possibility for image display on a CRT (Cathode-Ray Tube) or a liquid crystal display, for example.

Moreover, in the above embodiment, described is the case of finding differential data for compression of the image data. Alternatively, any other compression will surely do.

In the above embodiment, described is the case in which the correction processes for execution on the side of the PC 200 and the correction processes for execution on the side of the projector 300 are separated based on the performance capabilities of the PC 200. This is surely not restrictive and the correction processes for execution on the side of the PC 200 and the correction processes for execution on the side of the projector 300 may be separated in consideration of not only the performance capabilities of the PC but also the characteristics of image data for display. That is, in addition to the performance capabilities of the PC 200, the type of the image data may be considered to separate the correction processes for execution on the side of the PC 200 and the correction processes for execution on the side of the projector 300, e.g., whether the transmission speed is important for the image data such as moving images, or whether the display quality comes first for the image data such as still images instead of the processing speed or the transmission speed.

Exemplified in the above embodiment as an information processing device is a PC, but the PC is surely not the only option, and may be various types of game machines, DVD players, photo viewers, and others.

Moreover, an image correction program in the information processing device for use to make the image correction computing section 240 of the PC 200 to execute the correction processes on the side of the PC 200 described in the above embodiment may be recorded in various types of recording media. Similarly, an image correction program in the image display device for use to make the image correction computing section 340 of the projector 300 to execute the correction processes on the side of the projector 300 may be recorded in various types of recording media.

As such, the scope of the invention includes also a recording medium recorded with an image correction program in an Information processing device, and a recording medium recorded with an image correction program in an image display device. These image correction programs may be acquired over a network.

The entire disclosure of Japanese Patent Application Nos. 2006-186377, filed Jul. 6, 2006 and 2007-140020, filed May 28, 2007 are expressly incorporated by reference herein.

What is claimed is:

1. An image display system, comprising:
an information processing device that applies a predetermined correction process to image data for display; and
an image display device that displays an image based on the image data processed by the correction process in the information processing device, wherein:
the information processing device includes a first image correction computing section that applies a correction process based on performance capabilities of the information processing device from among a plurality of correction processes to the image data, and
the image display device includes a second image correction computing section that applies at least one of a plurality of correction processes other than the correction process executed in the information processing device to the image data being a result of the correction process in the information processing device.

2. The image display system according to claim 1, wherein the information processing device and the image display device are connected together by a signal transmission unit.

3. The image display system according to claim 1, wherein the information processing device includes a performance assessment section that assesses the performance capabilities of the information processing device, and
based on the performance capabilities of the information processing device being an assessment result of the performance assessment section, the first image correction computing section selects, for setting, from the plurality of correction processes for application to the image data, any of the correction processes for application in the information processing device.

4. The image display system according to claim 3, wherein the performance assessment section assesses the performance capabilities of the information processing device based on a graphic computing power of the information processing device.

5. The image display system according to claim 4, wherein the graphic computing power of the information processing device is assessed at least by either a computing throughput of software or a computing throughput of hardware related to the graphic computing power.

6. The image display system according to claim 5, wherein the computing throughput of hardware and the computing throughput of software related to the graphic computing power are assessed by running, in the information processing device, a program for assessing the graphic computing power.

7. The image display system according to claim 1, wherein the plurality of correction processes for application to the image data are classified into a first correction process group for any of the correction processes to be executed in a first half of a correction process sequence, and a second correction process group for any of the correction processes to be executed in a latter half of the correction process sequence, and
the first image correction computing section executes when the performance capabilities of the information processing device are of a reference value or more, the correction processes both in the first and second correction process groups.

8. The image display system according to claim 1, wherein the information processing device has a function of notifying, to the image display device, information about the correction process to be executed in the information processing device among the plurality of correction processes for application to the image data.

9. The image display system according to claim 1, wherein the information processing device includes transmission data generation section that generates transmission data, for transmission to the image display device, by compressing the image data with the correction process in the first image correction computing section.

10. The image display system according to claim 1, wherein the information processing device Includes a correction parameter storage section that stores therein a correction parameter needed for the correction process to be executed in the first image correction computing section.

11. An information processing device that applies a predetermined correction process to image data for display by an image display device, comprising:

an image correction computing section that applies a correction process based on performance capabilities of the information processing device from among a plurality of correction processes to the image data, wherein the image correction computing section is configured to notify the image display device of the information about the correction process to be executed in the information processing device.

12. The image display device according to claim 11, wherein the image correction computing section notifies the image display device of all of the correction processes already applied by the image correction computing section.

13. The information processing device according to claim 11, further comprising:

a performance assessment section that assesses the performance capabilities of the information processing device based on a graphic computing power of the information processing device, and generates an assessment result and based on the assessment result, the image correction computing section selects any of the correction processes for application in the information processing device from the plurality of correction processes for application to the image data.

14. An image display device that displays an image based on image data being a result of a correction process executed in an information processing device in accordance with performance capabilities of the information processing device, comprising:

an image correction computing section that applies at least one of the plurality of correction processes other than the correction process to be executed in the information processing device to the image data being the result of the of the correction process in the information processing device, the image correction computing section having a function of selecting any correction process being a part of the plurality of correction processes that are for application to the image data, as notified by the information processing device, but not the correction process to be executed in the information processing device, based on information about the correction process to be executed in the information processing device.

* * * * *